US011727654B2

(12) United States Patent
Chen et al.

(10) Patent No.: US 11,727,654 B2
(45) Date of Patent: *Aug. 15, 2023

(54) AMBIENT LIGHT BASED MIXED REALITY OBJECT RENDERING

(71) Applicant: Microsoft Technology Licensing, LLC, Redmond, WA (US)

(72) Inventors: Guojun Chen, Redmond, WA (US); Yue Dong, Redmond, WA (US); Xin Tong, Beijing (CN); Yingnan Ju, Redmond, WA (US); Pingchao Yu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,776

(22) Filed: Sep. 12, 2022

(65) Prior Publication Data
US 2023/0072701 A1    Mar. 9, 2023

Related U.S. Application Data

(63) Continuation of application No. 16/635,485, filed as application No. PCT/US2018/038663 on Jun. 21, 2018, now Pat. No. 11,461,978.

(30) Foreign Application Priority Data

Aug. 25, 2017   (CN) .......................... 201710744763.0

(51) Int. Cl.
*G06T 19/00*    (2011.01)
*G06F 1/16*    (2006.01)
*G06F 3/01*    (2006.01)

(52) U.S. Cl.
CPC ............ *G06T 19/006* (2013.01); *G06F 1/163* (2013.01); *G06F 3/011* (2013.01)

(58) Field of Classification Search
CPC ......... G06T 19/006; G06F 1/163; G06F 3/011
See application file for complete search history.

(56) References Cited

U.S. PATENT DOCUMENTS

2015/0264278 A1* 9/2015 Kleekajai ............. H04N 5/2351
                                                   348/227.1
2015/0325048 A1   11/2015 Engle et al.
(Continued)

FOREIGN PATENT DOCUMENTS

CN      101246600 A      8/2008
CN      103814343 A      5/2014
(Continued)

OTHER PUBLICATIONS

"First Office Action and Search report Issued in Chinese Patent Application No. 201710744763.0", dated Sep. 20, 2022, 28 Pages.
(Continued)

*Primary Examiner* — Said Broome
*Assistant Examiner* — Andrew Shin
(74) *Attorney, Agent, or Firm* — Schwegman Lundberg & Woessner, P.A.

(57) ABSTRACT

Implementations of the subject matter described herein relate to mixed reality object rendering based on ambient light conditions. According to the embodiments of the subject matter described herein, while rendering an object a wearable computing device acquires light conditions of the real world, thereby increasing the reality of the rendered object. In particular, the wearable computing deice is configured to acquire an image of an environment where the wearable computing deice is located. The image is adjusted based on a cement parameter used when the image is captured. Subsequently, ambient light information is determined based on the adjusted image. In this way, the wearable computing deice can obtain more real and accurate emblem light information, so as to render to the user an object with
(Continued)

enhanced reality. Accordingly, the user can have a better interaction experience.

20 Claims, 7 Drawing Sheets

(56) References Cited

U.S. PATENT DOCUMENTS

2016/0080672 A1    3/2016  Braun et al.
2018/0211440 A1*   7/2018  Kunkel .................. G09G 3/00

FOREIGN PATENT DOCUMENTS

CN    106603904 A    4/2017
CN    106662930 A    5/2017

OTHER PUBLICATIONS

Lin, et al., "High-Quality Real-Time Augmented Reality with Automatic Environment Map Alignment", In the Journal of Computer-Aided Design and Computer Graphics, vol. 23, Issue 10, Oct. 2011, pp. 1641-1648.

"Notice of Allowance Issued in European Patent Application No. 18746025.8", dated Dec. 7, 2022, 7 Pages.

* cited by examiner

AMBIENT LIGHT BASED MIXED REALITY OBJECT RENDERING

CROSS-REFERENCE TO RELATED APPLICATION

This application is a continuation application of U.S. application Ser. No. 16/635,485, filed Jan. 30, 2020, which application is a U.S. National Stage Filing under 35 U.S.C. 371 of International Patent Application Serial No. PCT/US2018/038663, filed Jun. 21, 2018, and published as WO 2019/040169 A1 on Feb. 28, 2019, which claims priority to Chinese Application No. 201710744763.0 filed Aug. 25, 2017, which applications and publication are incorporated herein by reference in their entirety.

BACKGROUND

A wearable computing device is a portable device which can be directly borne on a user's body or worn on a user's clothes or accessories. Wearable computing devices take various forms, such as head-mounted devices like glasses and helmets, hand-mounted devices like watches and bracelets, leg-mounted devices like shoes and socks, as well as other forms like smart clothing, bags, crutches and accessories.

Through hardware and software support as well as data interaction and cloud interaction, wearable computing devices may provide a variety of functions, exerting an increasingly great influence on people's work, living and learning. Take a head-mounted device as an example. By combining virtuality and reality, the head-mounted device can provide better interactivity to users. In particular, a user may easily identify a virtual object in a real scenario and send instructions to the object, so that the object is caused to complete corresponding operations according to the instructions. By means of such kind of head-mounted devices, users may carry out operations in games, simulate real meetings and perform 3D modeling by gesturing, thereby effectively improving user interaction experience.

SUMMARY

While rendering a virtual object, light conditions of the real world are important to reality of the rendered object and user experience. Embodiments of the subject matter described herein provide a method and device for mixed reality object rendering. According to the embodiments of the subject matter described herein, while rendering an object, a wearable computing device takes light conditions in the real world into account, thereby improving reality of the rendered object. In particular, the wearable computing device is configured to acquire an image of an environment where the wearable computing device is located. The image is adjusted based on a camera parameter used when the image is captured. Subsequently, ambient light information is determined based on the adjusted image. In this way, the wearable computing device can obtain more real and accurate ambient light information, so as to render to the user an object with enhanced reality. Accordingly, the user can have a better interaction experience.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

Through the more detailed description in the accompanying drawings, the above and other features, advantages and aspects of the subject matter described herein will become more apparent, wherein the same or similar reference numerals refer to the same or similar elements.

Throughout the figures, same or similar reference numbers will always indicate same or similar elements.

DETAILED DESCRIPTION

Embodiments of the subject matter described herein will be described in more detail with reference to the accompanying drawings, in which some embodiments of the subject matter described herein have been illustrated. However, the subject matter described herein can be implemented in various manners, and thus should not be construed to be limited to the embodiments disclosed herein. On the contrary, those embodiments are provided for the thorough and complete understanding of the subject matter described herein, and completely conveying the scope of the subject matter described herein to those skilled in the art. It should be understood that the accompanying drawings and embodiments of the subject matter described herein are merely for the illustration purpose, rather than limiting the protection scope of the subject matter described herein.

The term "comprise" and its variants used in embodiments of the subject matter described herein are to be read as open terms that mean "comprise, but is not limited to." The term "based on" is to be read as "based at least in part on." The terms "one embodiment" and "an implementation" are to be read as "at least one embodiment." The term "another embodiment" is to be read as "at least one other embodiment." Definitions of other terms will be presented in description below.

The subject matter described herein proposes a method and device for mixed reality object rending, which determine ambient light information based on an image of an environment where a wearable computing device is located, and further render the object to a user based on the ambient light information. The ambient light information discussed herein comprises information about light intensities in a plurality of directions of an environment where the wearable computing device is located. In this way, the method and device according to embodiments of the subject matter described here can apply ambient light factors to the object rendering process, thereby rendering the object to the user more really and accurately. As such, the user experience can be improved effectively.

Figure 1:
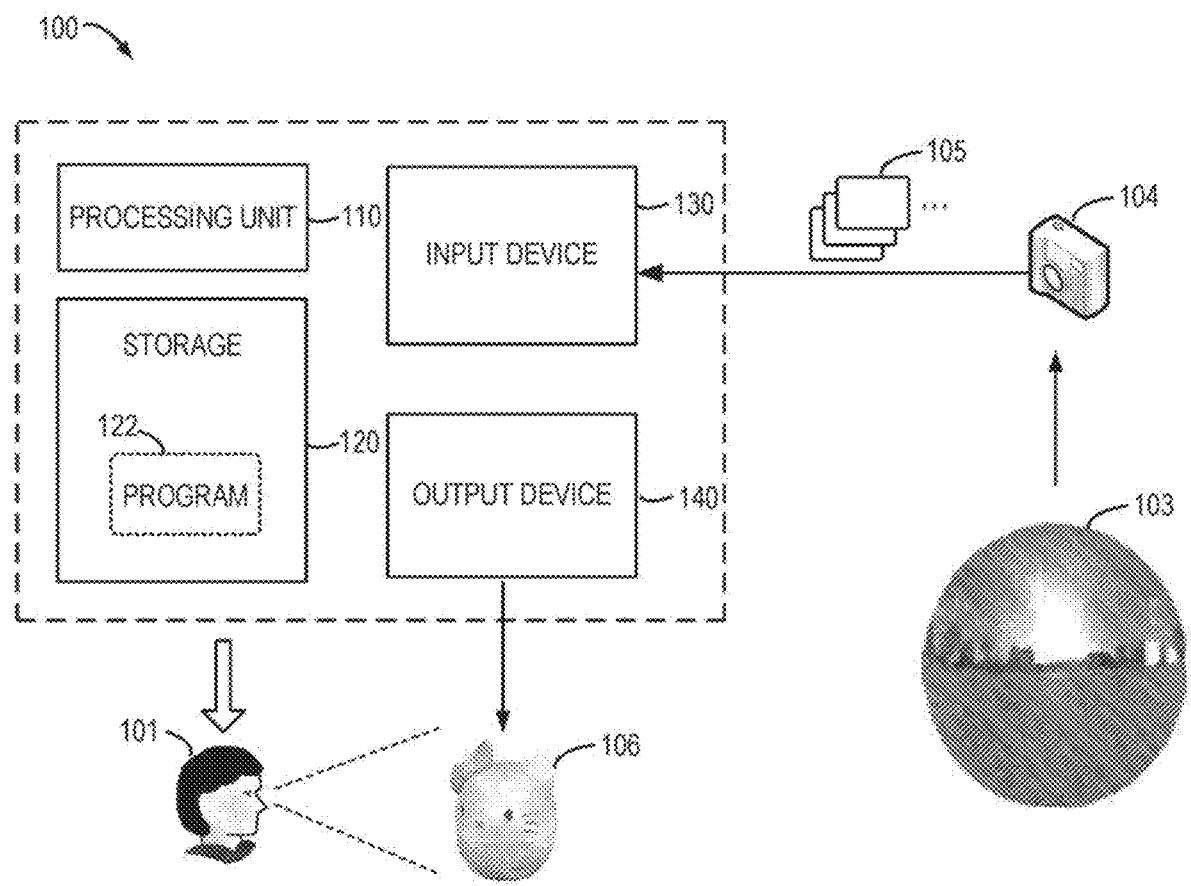
FIG. 1 shows a block diagram of a wearable computing device 100 in which one or more embodiments of the subject matter described herein can be implemented.

FIG. 1 shows a block diagram illustrating a wearable computing device 100 in which the embodiments of the subject matter described herein can be implemented. It should be understood that the wearable computing device 100 shown in FIG. 1 is merely illustrative and does not form any limitation to the functionality and scope of the embodiments described herein.

The wearable computing device 100 may be used for implementing the object rendering process according to the embodiments of the subject matter described herein, and may be implemented in various forms such as smart glasses, smart helmets, smart headphones which are wearable for a user 101.

An image 105 of an environment 103 in which the wearable computing device 100 is located may be acquired by a camera 104, and the image 105 may be adjusted on the basis of a camera parameter used by the camera 104 for capturing the image 105. Then, ambient light information may be determined based on the adjusted image. The ambient light information determined as such at least indicates light intensities in a plurality of directions under the environment, such that the wearable computing device 100 can render an object 106 to the user 101 by using the ambient light information.

The wearable computing device 100 may further adjust a shooting direction of the image 105, depending on a Field of View (FOV) range of the camera 104. In addition, the wearable computing device 100 may further update existing ambient light information (also referred to as "original ambient light information" below) by using the determined ambient light information.

Components of the wearable computing device 100 may comprise, but not limited to, one or more processors or processing units 110, a storage device 120, one or more input devices 130 as well as one or more output devices 140. The processing unit 110 may be a real or virtual processor and can execute various processing according to programs stored in the storage device 120. In a multi-processor system, multiple processing units concurrently execute computer executable instructions so as to increase the concurrent processing capability of the wearable computing device 100.

The wearable computing device 100 usually comprises a plurality of computer storage media. Such media may be any available media that are accessible to the wearable computing device 100, comprising, but not limited to, volatile and non-volatile media, removable and non-removable media. The storage device 120 may be a volatile memory (e.g., register, cache, random-access memory (RAM)), non-volatile memory (e.g., read-only memory (ROM), electrically erasable programmable read-only memory (EEPROM), flash memory), or some combination thereof. The storage device 120 may also be removable or non-removable media, and may comprise machine readable media, such as flash drivers, magnetic disks or any other media, which can be used for storing information and/or data and which can be accessed within the wearable computing device 100.

The wearable computing device 100 may further comprise other removable/non-removable and volatile/non-volatile storage media. Although not shown in FIG. 1, there may be provided magnetic disk drivers for reading from or writing to removable and non-volatile magnetic disks, and optical disk drivers for reading from or writing to removable and non-volatile optical disks. In these cases, each driver may be connected to a bus (not shown) by one or more data media interfaces. The storage device 120 may comprise one or more program products 122, with one or more program module sets, which program modules are configured to perform functions of various embodiments described herein.

The input device 130 may be one or more of different input devices, such as a mouse, keyboard, trackball, voice input device, etc. The output device 140 may be one or more output devices, such as a display, speaker, printer, etc.

As shown in FIG. 1, the camera 104 acquires the image 105 of the environment 103 where the wearable computing device 100 is located, and provides the image to the input device 130 of the wearable computing device 100. Then, the wearable computing device 100 acquires ambient light information based on the received image 105 and thereby renders the object 106 based on the ambient light information, so that the user 101 can see the object 106 having an ambient light effect. It should be understood that the ambient light information may be determined according to one or more images 105 captured by the camera 104. Although FIG. 1 shows a plurality of images 105, this is merely exemplary and not intended to limit the scope of the subject matter described herein.

Figure 2:
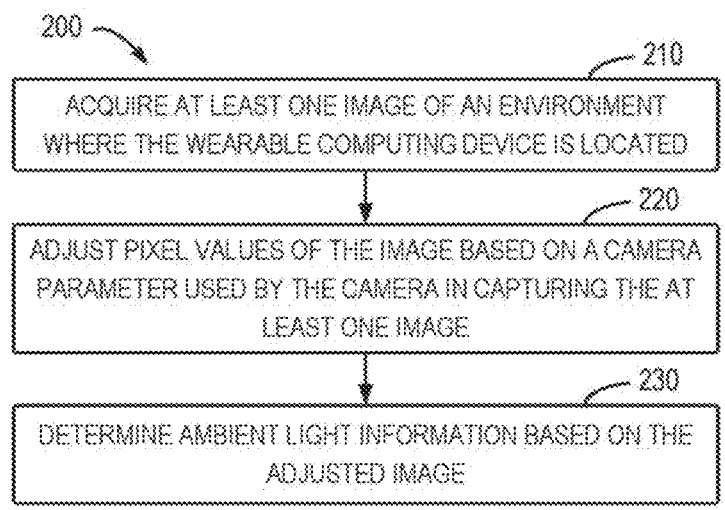
FIG. 2 shows a flowchart of a method 200 for acquiring ambient light information according to embodiments of the subject matter described herein.

Several exemplary embodiments of the method and device for object rendering by considering ambient light conditions will be described in more details. FIG. 2 shows a flowchart of a method 200 for acquiring ambient light information according to an embodiment of the subject matter described herein. In some embodiments, the method 200 may be executed by the processing unit 110 described with reference to FIG. 1.

In block 210, at least one image 105 of the environment 103 where the wearable computing device 100 is located is acquired. Ambient light information at least indicates light intensities in multiple directions of the environment 103 where the wearable computing device 100 is located. According to the embodiments of the subject matter described herein, the user 101, the wearable computing device 100 and the object 106 are located in the same environment 103, so the environment 103 where the wearable computing device 100 is located is the same as the environment where the user 101 and/or object 106 are located.

Such an image 105 may be acquired in a variety of ways. In some embodiments, the wearable computing device 100 receives an image of the environment 103 captured by the camera 104 that operatively communicates with the wearable computing device 100. The camera 104 may be a normal camera such as a digital camera, a smart telephone, and a non-panorama camera on a tablet computer. It should be understood the foregoing examples of the camera 104 are merely for the discussion purpose, which are not limiting or intended to limit the scope of the subject matter described herein in any way. Those skilled in the art may use any other available devices to acquire the image of the environment 103.

According to the embodiment of the subject matter described herein, the camera 104 operatively communicates with the wearable computing device 100. In one embodiment, the camera 104 and the wearable computing device 100 are separately disposed. The camera 104 may be disposed at a fixed location relative to the wearable computing device 100, for example, a location in front of the wearable computing device 100 at a predefined distance. The camera 104 may be connected with the wearable computing device 100 via a communication network (e.g., WIFI, Bluetooth, etc.) and deliver the acquired image to the wearable computing device 100 in the form of a video stream.

Alternatively, in another embodiment, the camera 104 may be integrated on the wearable computing device 100, so that it can change its location according to the movement of the user 101 who wears the wearable computing device 100. In this way, the scenario captured by the camera 104 can be ensured to keep consistent with the location of the user 101. As a result, a light effect that better matches the environment 103 can be acquired.

In some embodiments, while capturing the image 105, a shooting direction of the camera 104 may be determined in advance, so that the environment 103 where the wearable computing device 100 is located can be fully covered. In one embodiment, multiple shooting directions for covering the environment 103 may be determined based on a parameter indicating the FOV range of the camera 104, and the camera 104 is caused to capture images according to the determined shooting directions. Different models of cameras may have different FOV range parameters. The FOV range may be fixed or variable. Depending on different FOV ranges, the number and shooting directions of images for covering the environment 103 also differ somewhat. For example, where the largest Horizontal Field of View (FOV) of the camera 104 is 67 degrees, 34 shooting directions may be determined to capture 34 images capable of covering the environment 103.

Figure 3:
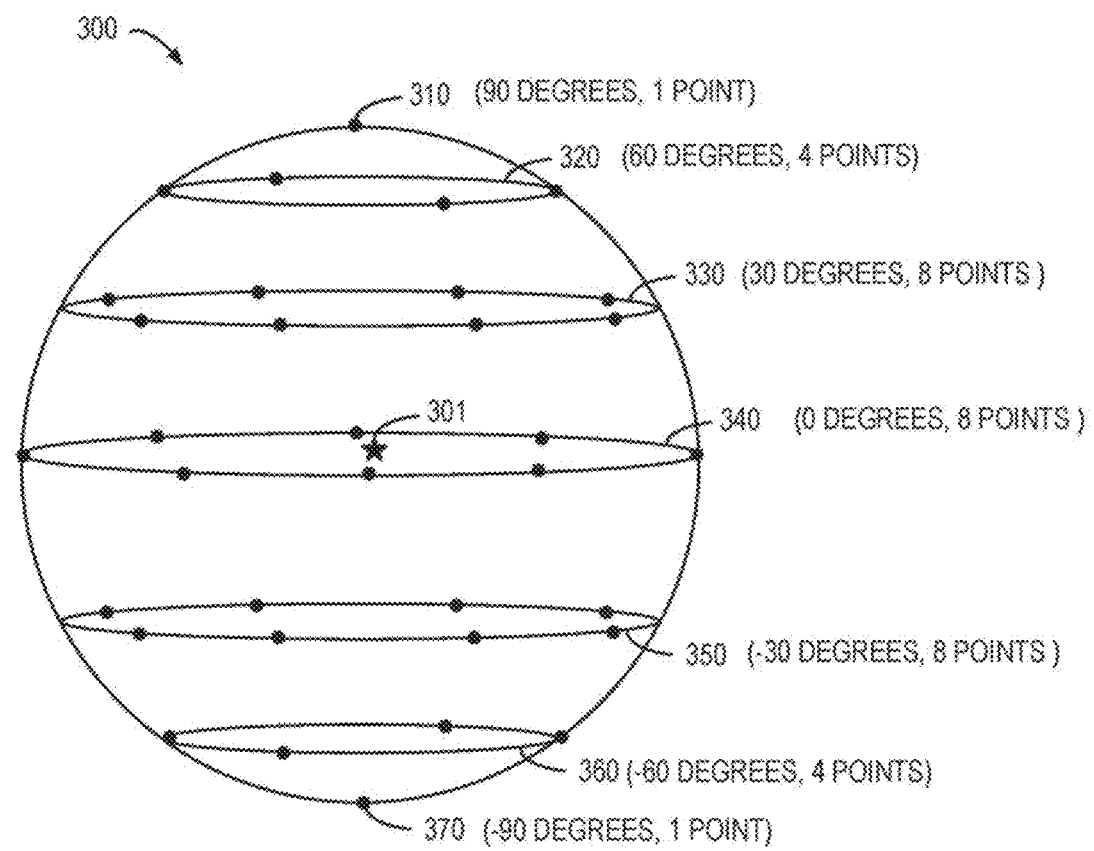
FIG. 3 shows a schematic view of a shooting direction 300 according to embodiments of the subject matter described herein.

FIG. 3 shows a schematic view of a camera 300 according to an embodiment of the subject matter described herein. In an example as shown in FIG. 3, assuming that the wearable computing device 100 with the camera 104 is in a position 301, then 34 points are shown in a spherical coordinate system whose coordinate origin is the position 301, each point corresponding to one shooting direction. Specifically, one point is shown in each of positions 310 and 370 that correspond to 90 degrees and −90 degrees, respectively; four points are shown in each of positions 320 and 360 that correspond to 60 degrees and −60 degrees, respectively; moreover, eight points are shown in each of positions 330, 340, 350 that correspond to 30 degrees, 0 degree and −30 degrees, respectively. In one embodiment, the user 101 of the wearable computing device 100 at the coordinate origin 301 may take images towards these 34 points, thereby acquiring 34 images capable of covering the environment 103.

It should be understood the shooting directions shown in FIG. 3 are merely exemplary but not limiting. A relationship between the FOV range and the determined shooting direction of the camera may be determined according to multiple conventional modes or algorithms, which is omitted here.

In some embodiments, the wearable computing device 100 may prompt the determined shooting directions to the user 101, for example, displaying in these directions reference objects (e.g., white balloons) having a predefined shape, color, flicker mode, and/or the like. Thus, when the user 101 looks at the reference object according to prompts (e.g., voice prompts, visual prompts, etc.), the camera 104 of the wearable computing device 100 may automatically take an image according to the shooting direction. In this way, the plurality of images 105 covering the environment 103 may be captured according to the multiple shooting directions.

In some embodiments, the camera 104 may comprise more than one camera (e.g., front camera and rear camera) that may capture an image respectively, so images of the environment 103 may be captured more rapidly and effectively. It should be understood although the foregoing embodiments have described the example of acquiring multiple images 105 in block 210, this is merely exemplary and does not limit the scope of the subject matter described herein. In other embodiments of the subject matter described herein, the ambient light information may also be determined only according to a single image 105 acquired in block 210. The single image 105 may be acquired according to the determined shooting direction, or may be an image of the environment 103 which is acquired by the camera 104 according to a current direction at a predefined time point. Acquiring a single image 105 is more rapid and flexible than acquiring multiple images 105.

After receiving the image 105 of the environment 103 from the camera 104, the wearable computing device 100 may store the image to a temporary image buffer so as to adjust the image.

Returning to FIG. 2, in block 220, pixel values of the image 105 are adjusted based on the camera parameter used by the camera 104 in capturing the image 105. The camera parameter may comprise one or more parameters used by the camera 104 in capturing the image 105, such as an exposure time, light sensitivity (ISO), light exposure, an aperture size, a shutter speed and/or other parameter. In some embodiments, pixel values of the image 105 may be adjusted based on the camera parameter by various means. For example, the image 105 may be regularized using a formula as below:

$$\text{Color}(r, g, b, a) = \text{OriginalColor}(r, g, b, a)^{Gamma} * \frac{1}{ExposureTime * ISO}, \quad (1)$$

where Gamma represents a gamma correction parameter, OriginalColor(r,g,b,a) represents pixel values of an unadjusted image, Color(r,g,b,a) represents pixel values of an adjusted image, and r, g, b and a denote a red value, green value, blue value and alpha value of one pixel of an image respectively, the alpha value indicating the pixel's opacity which, for example, ranges between 0 and 255. In addition, in Formula (1), ExposureTime represents an exposure time of the camera, and ISO represents light exposure of the camera.

According to Formula (1), the image 105 may be adjusted as a "regularized" image. Where the ambient light information is determined based on multiple images 105, by adjusting these images 105 as such, the brightness of respective images may be adjusted to a uniform reference level, so that the ambient light information may be determined more accurately on the basis of these images.

It should be understood Formula (1) is merely one example of adjusting the image and is not intended to limit the embodiments of the subject matter described herein. Those skilled in the art should appreciate that besides Formula (1), the image may be adjusted by any other appropriate means.

Figure 4:
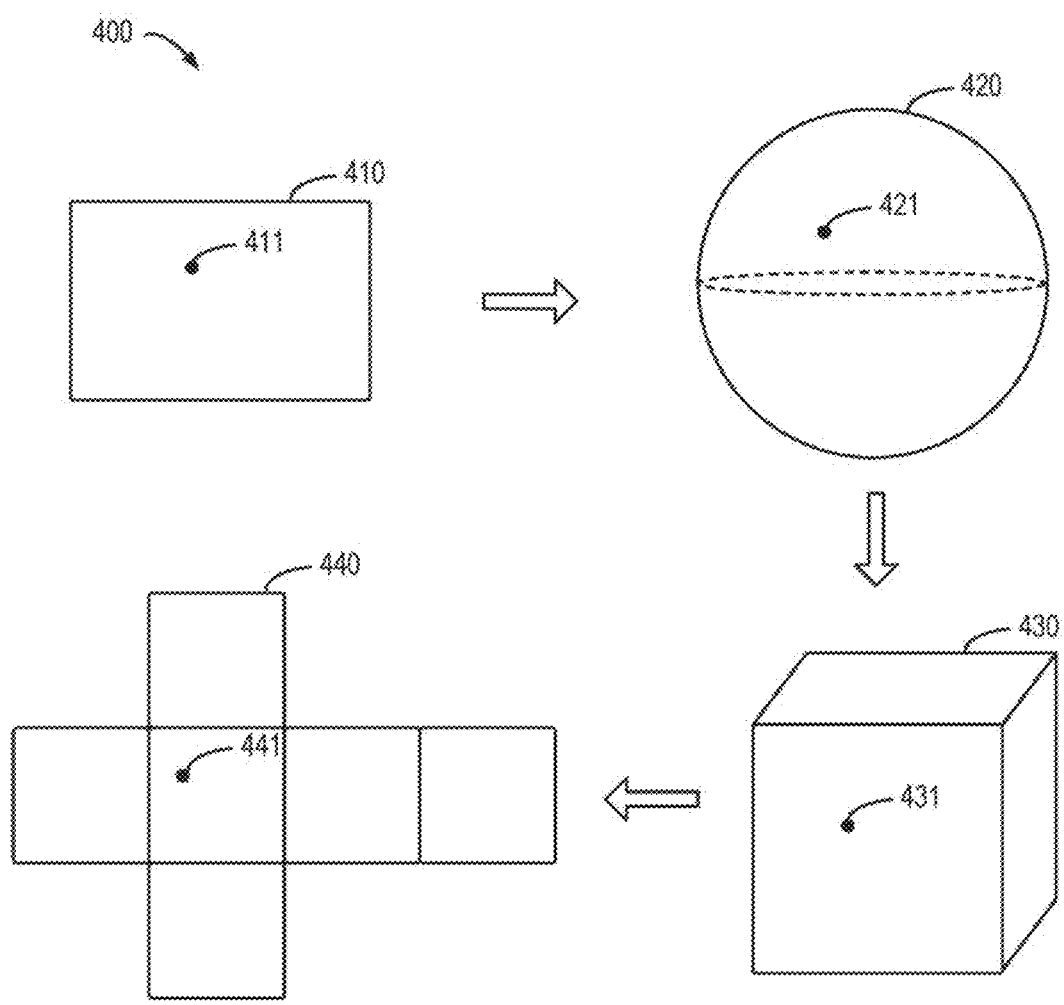
FIG. 4 shows a schematic view of a process 400 of generating ambient light information according to embodiments of the subject matter described herein.
Figure 5:
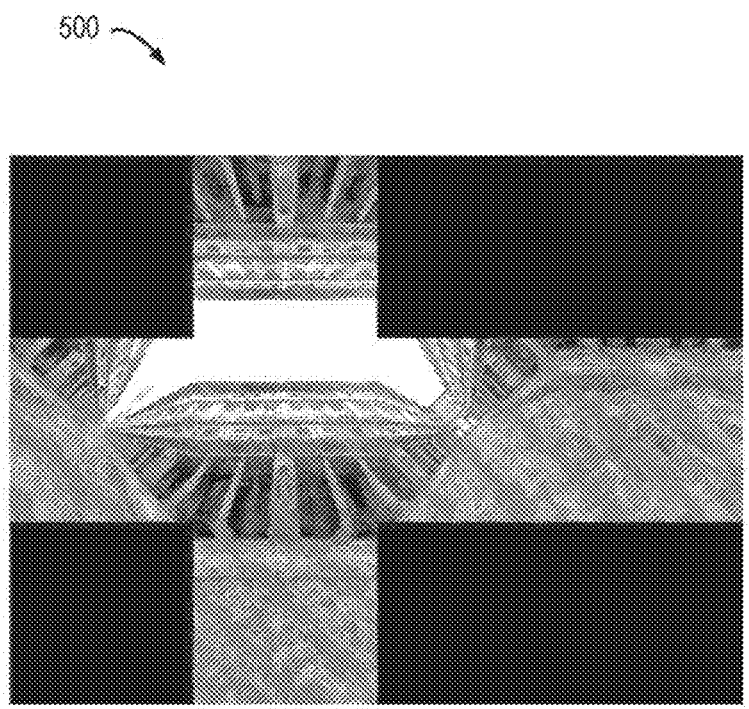
FIG. 5 shows a schematic view of a cube map 500 of ambient light information according to embodiments of the subject matter described herein.

In block 230, ambient light information is determined based on the adjusted image 105. The ambient light information at least indicates light intensities in multiple directions under the environment 103. In some embodiments, a panorama image of the environment 103 may be generated based on the adjusted image 105. This may be implemented according to a conventional panorama stitching method, for example, which is omitted here. In embodiments where the number of images 105 is much less (e.g., only one image 105), ambient light information may be determined directly based on the image, instead of a panorama image being generated. In an alternative embodiment, a panorama image may be generated based on the image, wherein the panorama image can reflect a part of ambient light conditions and thus may be referred to as "partial panorama image." Then, the image 105 or the generated panorama image may be converted to a stereogram, such as a cube map, a mirror ball, etc., and may be used as ambient light information in its entirety or in part. Such conversion process may be completed by a predefined remapping operation. FIG. 4 shows a schematic view of a relevant process 400, which will be described in detail below. Take a cube map as an example. It uses a hexahedral cube to represent the surrounding light environment, facilitating a graphics processing unit (GPU) of the wearable computing device 100 to render the object 106 more efficiently. FIG. 5 shows an exemplary cube map 500 according to embodiments of the subject matter described herein.

With reference to the embodiments shown in connection with FIG. 4, a detailed discussion is presented to the process 400 of generating ambient light information. In the example shown in FIG. 4, suppose the images 105 captured by the camera 104 each have locatable information which can be used to calculate the position of the camera, and a panorama image 410 may be generated based on the images 105. A point 411 on the panorama image 410 may be transformed to a point 421 of a sphere 420 in a first transformation. Then, the point 421 may be transformed to a point 431 on a cube 430 in a second transformation. Later, the point 431 may be transformed to a point 441 on a cube map 440 with six sides in a third transformation. Through the three transformations, each point on the panorama image 410 may be transformed to a point on the cube map 440, so that the cube map 440 corresponding to the panorama image 410 may be obtained. The cube map 440 may be implemented as a stereogram 500 shown in FIG. 5 for example.

It should be understood that various technologies for transformation under different coordinate systems are well known. Therefore, the transformations (e.g., the first transformation, the second transformation and/or the third transformation) shown in the embodiment of FIG. 4 may be implemented by any method that is currently known or to be developed in the future, which will not limit the embodiments of the subject matter described herein and is omitted accordingly.

According to embodiments of the subject matter described herein, the ambient light information may be implemented as an image, video, or any other file in an appropriate format. It should be understood that the ambient light information described in the form of a cube map is discussed for illustration, without suggesting any limitation to the scope of the subject matter described herein.

Additionally, in some embodiments of the subject matter described herein, the object 106 may be rendered to the user 101 of the wearable computing device 100 based on the determined ambient light information. For example, the wearable computing device 100 may use the cube map as an initial light map and perform down-sampling to the initial light map. For example, pixels in the initial light map may be iteratively averaged by a predefined resolution reduction factor, thereby generating a set of down-sampled light maps having different resolutions.

Specifically, for the initial light cube map, a complete set of down-sampled lighting maps, e.g., a Mip-map chain, may be generated quickly. The set of down-sampled light maps are composed of light cube maps having different resolutions, and are approximate representations of light cube maps under different resolutions. The down-sampling solution according to the subject matter described herein may be implemented in various ways. In some embodiments, a predefined number (e.g., 4) of pixels at corresponding positions of the upper-layer light map may be directly averaged.

Then, the wearable computing device 100 may determine an appearance of the object 106 on the basis of the set of down-sampled light maps and render the appearance to the user 101. In embodiments of the subject matter described herein, the appearance of the object 106 may be composed of a plurality of points. The wearable computing device 100 may use the set of down-sampled light maps to determine diffuse reflectance intensities and specular reflectance intensities of the plurality of points on the object 106. Afterwards, the appearance of the object 106 may be determined on the basis of diffuse reflectance intensities and specular reflectance intensities of these points.

In this way, a more real appearance of the object 106 under the current environment may be provided to the user 101. As compared with conventional solutions for rending an object according to predefined light conditions, the wearable computing device 100 according to the embodiments of the subject matter described herein can obtain more real and accurate ambient light information, thereby improving the reality of the rendered object. As such, it can be avoided a drawback in the conventional solutions that the user cannot feel real light conditions in the real world, and accordingly the user's interaction experience can be improved.

Optionally, in some embodiments of the subject matter described herein, existing ambient light information may further be updated using the determined ambient light information. Such existing ambient light information may be, for example, information concerning ambient light as preset to the wearable computing device 100. Alternatively or additionally, the existing ambient light information may further be historical ambient light information determined by the wearable computing device 100 at a previous time point, etc. For the sake of discussion, the information is collectively referred to as "original ambient light information" here.

The process of updating the ambient light information may be automatically executed by the wearable computing device 100 at preset time periodically or a periodically, and/or may be initiated by the user 101 where necessary. In one embodiment, when the user 101 feels a significant change in the surrounding ambient light, he/she may trigger the camera 104 to take pictures of an area where the light changes dramatically. In this way, the ambient light information used by the wearable computing device 100 can be more consistent with the actual light situation of a current environment, which helps to improve the reality of the rendered object.

Specifically, in some embodiments, the wearable computing device 100 may determine whether there exists such original ambient light information or not. If yes, then the original ambient light information may be updated using the ambient light information determined in block 230. During updating of the original ambient light information, the original ambient light information may be modified if a predefined condition is met, or the original ambient light information will not be modified at all if a predefined condition is not met.

Figure 6:
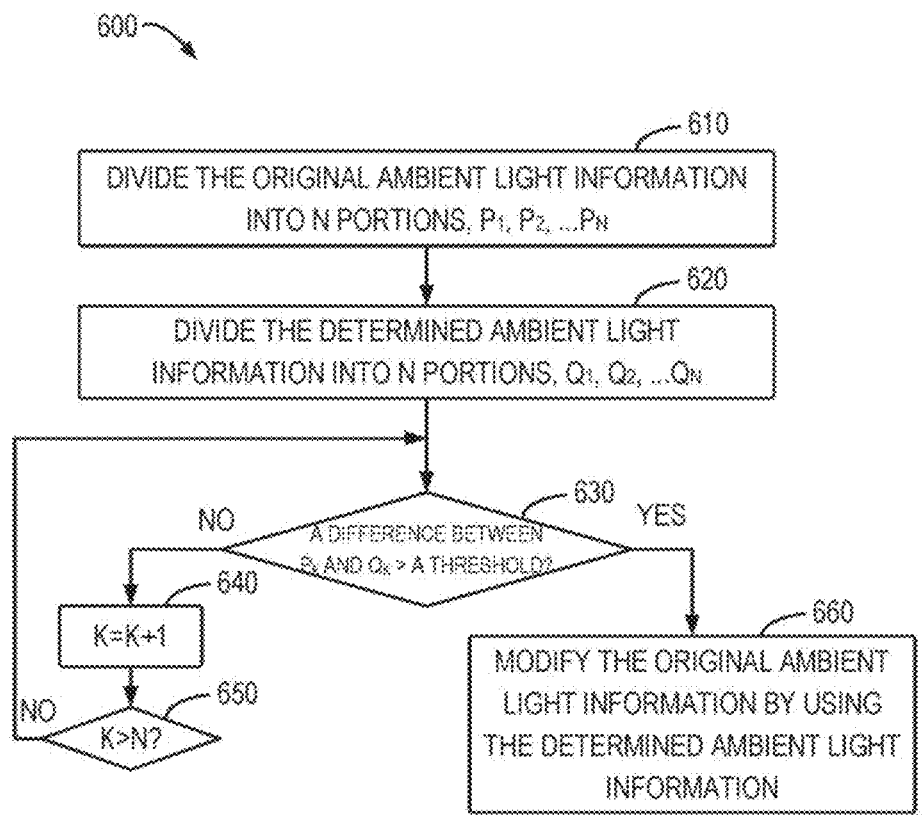
FIG. 6 shows a flowchart of a method 600 for updating ambient light information according to embodiments of the subject matter described herein.

For example, in one embodiment, the original ambient light information may be divided into a plurality of portions (hereinafter referred to as "a plurality of original portions" for purpose of discussion), and the determined ambient light information in block 230 may be divided into a plurality of portions (hereinafter referred to as "a plurality of determined portions" for purpose discussion). Then, by comparing the plurality of original portions with the plurality of determined portions, it may be determined whether to modify the original ambient light information by using the determined ambient light information. FIG. 6 shows a flowchart of a method 600 for updating ambient light information according to the embodiments.

In block 610, the original ambient light information is divided into N original portions, denoted as $P_1, P_2, \ldots, P_N$, wherein N is an integer larger than or equal to 1. In block 620, the determined ambient light information is divided into N determined portions, denoted as $Q_1, Q_2, \ldots, Q_N$. If a difference between one original portion $P_K$ among the N original portions and a corresponding determined portion $Q_K$ (wherein $1 \leq K \leq N$, and K is an integer) is larger than a threshold difference, then the original ambient light information may be modified using the determined ambient light information.

In block 630, it is judged whether a difference between $P_K$ and $Q_K$ is larger than a threshold difference. The threshold difference may be predetermined in various ways, e.g., according to an empirical value, a previously calculated difference value, or the like. It may be determined from the threshold difference whether there is a significant change between $P_K$ and $Q_K$. If the difference between $P_K$ and $Q_K$ exceeding the threshold difference, it may be determined that there is a considerable difference between the original ambient light information and the current determined ambient light information. At this point, in block 660 the original ambient light information is modified using the determined ambient light information.

On the contrary, if it is decided in block 630 that the difference between $P_K$ and $Q_K$ is less than or equal to the threshold difference, then in block 640 let K=K+1. In block 650, it is judged whether the flow goes to the last determined portion or original portion, i.e., it is judged whether K calculated in block 640 is larger than N. If K>N, this means the judgment on all original portions and their corresponding determined portions has been completed, and the difference between the original ambient light information and the current determined ambient light information is rather trivial. Thus, there is no need to modify the original ambient light information.

In this way, the ambient light information of the wearable computing device 100 may be updated dynamically or in real time, so that the ambient light information used by the wearable computing device 100 may be made more consistent with the actual light situation of a current environment and the reality of the rendered object may be improved.

Figure 7A:
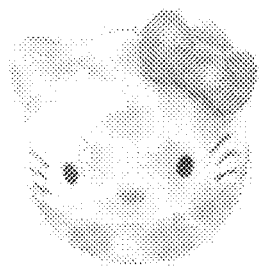
FIGS. 7A and 7B show schematic diagrams of an object rendered according to the prior art and an object rendered according to embodiments of the subject matter described herein, respectively.
Figure 7B:
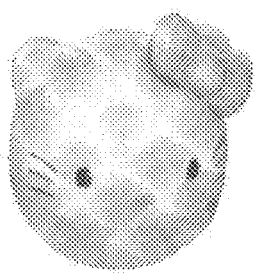

According to the embodiment of the subject matter described herein, the wearable computing device 100 acquires one or more images of an environment where it is located, determines ambient light information based on the adjusted image, and renders an object to a user based on the ambient light information. Therefore, during rendering the object 106, the wearable computing device 100 takes into consideration light conditions of the real world, thereby efficiently improving the reality of the rendered object and enhancing the user experience. FIGS. 7A and 7B show an object rendered according to the prior art and an object rendered according to embodiments of the subject matter described herein, respectively. It is clear compared with the object rendered according to the prior art as shown in FIG. 7A, the object rendered according to the embodiments of the subject matter described herein as shown in FIG. 7B has a better effect of ambient light and presents to the user a stronger sense of reality. This can significantly improve the user experience and accuracy of user interaction.

The methods and functions described in this specification may at least partly executed by one or more hardware logic components, and illustrative types of usable hardware logical components comprise field programmable gate array (FPGA), application-specific standard product (ASSP), system on chip (SOC), complex programmable logic device (CPLD), etc.

Program codes for carrying out methods of the subject matter described herein may be written in any combination of one or more programming languages. These computer program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of the subject matter described herein, a machine readable medium may be any tangible medium that may contain, or store a program for use by or in connection with an instruction execution system, apparatus, or device. The machine readable medium may be a machine readable signal medium or a machine readable storage medium. A machine readable medium may comprise but not limited to an electronic, magnetic, optical, electromagnetic, infrared, or semiconductor system, apparatus, or device, or any suitable combination of the foregoing. More specific examples of the machine readable storage medium would comprise an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in this specification in the context of separate implementations may also be implemented in combination in a single implementation. Conversely, various features that are described in the context of a single implementation may also be implemented in multiple embodiments separately or in any suitable sub-combination.

Listed below are some example implementations of the subject matter described herein.

The embodiments of the subject matter described herein comprise a computer implemented method. The method comprises: acquiring at least one image of an environment where a wearable computing device is located, the at least one image being captured by a camera that operatively communicates with the wearable computing device; adjusting pixel values of the at least one image based on a camera parameter used by the camera in capturing the at least one image; and determining, based on the at least one adjusted image, ambient light information that indicates light intensities in a plurality of directions in the environment.

In some embodiments, the acquiring at least one image of an environment where a wearable computing device is located comprises: determining a plurality of shooting directions required for covering the environment, based on a parameter indicating a Field of View range of the camera; and causing the camera to capture a plurality of images according to the plurality of shooting directions.

In some embodiments, the camera parameter may comprise at least one of: an exposure time, ISO, light exposure, an aperture size and a shutter speed.

In some embodiments, the determining ambient light information of the wearable computing device comprises: generating a panorama image of the environment based on the at least one adjusted image; and mapping the panorama image to a cube map indicating the ambient light information.

In some embodiment, the method further comprises: determining whether or not there exists original ambient light information of the environment where the wearable computing device is located; and in response to determining there exists the original ambient light information, updating the original ambient light information by using the determined ambient light information.

In some embodiments, the updating the original ambient light information by using the determined ambient light information comprises: dividing the original ambient light information into a first plurality of portions; dividing the determined ambient light information into a second plurality of portions; and in response to a difference between one of the first plurality of portions and a corresponding one of the second plurality of portions exceeding a threshold difference, modifying the original ambient light information by using the determined ambient light information.

In some embodiments, the method further comprises: rendering an object to a user of the wearable computing device based on the ambient light information.

In some embodiments, the rendering an object to a user of the wearable computing device based on the ambient light information comprises: generating an initial light map associated with the object based on the ambient light information; down-sampling the initial light map to generate a set of down-sampled light maps having different resolutions; and rendering the object based on the set of down-sampled light maps.

The embodiments of the subject matter described herein comprise a wearable computing device, comprising: a processing unit; a memory, coupled to the processing unit and having instructions stored therein which, when executed by the processing unit, perform actions comprising: acquiring at least one image of an environment where the wearable computing device is located, the at least one image being captured by a camera that operatively communicates with the wearable computing device; adjusting pixel values of the at least one image based on a camera parameter used by the camera in capturing the at least one image; and determining, based on the at least one adjusted image, ambient light information that indicates light intensities in a plurality of directions in the environment.

In some embodiments, the acquiring at least one image of an environment where the wearable computing device is located comprises: determining a plurality of shooting directions required for covering the environment, based on a parameter indicating a Field of View range of the camera; and causing the camera to capture a plurality of images according to the plurality of shooting directions.

In some embodiments, the camera parameter may comprise at least one of: an exposure time, ISO, light exposure, an aperture size and a shutter speed.

In some embodiments, the determining ambient light information of the wearable computing device comprises: generating a panorama image of the environment based on the at least one adjusted image, and mapping the panorama image to a cube map indicating the ambient light information.

In some embodiments, the acts further comprise: determining whether or not there exists original ambient light information of the environment where the wearable computing device is located; and in response to determining there exists the original ambient light information, updating the original ambient light information by using the determined ambient light information.

In some embodiments, the updating the original ambient light information by using the determined ambient light information comprises: dividing the original ambient light information into a first plurality of portions; dividing the determined ambient light information into a second plurality of portions; and in response to a difference between one of the first plurality of portions and a corresponding one of the second plurality of portions exceeding a threshold difference, modifying the original ambient light information by using the determined ambient light information.

In some embodiments, the acts further comprise: rendering an object to a user of the wearable computing device based on the ambient light information.

In some embodiments, the rendering an object to a user of the wearable computing device based on the ambient light information comprises: generating an initial light map associated with the object based on the ambient light information; down-sampling the initial light map to generate a set of down-sampled light maps having different resolutions; and rendering the object based on the set of down-sampled light maps.

The embodiments of the subject matter described herein further provide a computer program product stored in a non-transient storage medium and comprising machine executable instructions which, when running on a wearable computing device, cause the device to: acquire at least one image of an environment where the wearable computing device is located, the at least one image being captured by a camera that operatively communicates with the wearable computing device; adjust pixel values of the at least one image based on a camera parameter used by the camera in capturing the at least one image; and determine, based on the at least one adjusted image, ambient light information that indicates light intensities in a plurality of directions in the environment.

In some embodiments, the machine executable instructions, when running on a device, further cause the device to: determine a plurality of shooting directions required for covering the environment, based on a parameter indicating a Field of View range of the camera; and cause the camera to capture a plurality of images according to the plurality of shooting directions.

In some embodiments, the camera parameter may comprise at least one of: an exposure time, ISO, light exposure, an aperture size and a shutter speed.

In some embodiments, the machine executable instructions, when running on a device, further cause the device to: generate a panorama image of the environment based on the at least one adjusted image; and map the panorama image to a cube map indicating the ambient light information.

In some embodiments, the machine executable instructions, when running on a device, further cause the device to: determine whether or not there exists original ambient light information of the environment where the wearable computing device is located; and in response to determining there exists the original ambient light information, update the original ambient light information by using the determined ambient light information.

In some embodiments, the machine executable instructions, when running on a device, further cause the device to: divide the original ambient light information into a first plurality of portions; divide the determined ambient light information into a second plurality of portions; and in response to a difference between one of the first plurality of portions and a corresponding one of the second plurality of portions exceeding a threshold difference, modify the original ambient light information by using the determined ambient light information.

In some embodiments, the machine executable instructions, when running on a device, further cause the device to: render an object to a user of the wearable computing device based on the ambient light information.

In some embodiments, the machine executable instructions, when running on a device, further cause the device to: generate an initial light map associated with the object based on the ambient light information; down-sample the initial light map to generate a set of down-sampled light maps having different resolutions; and render the object based on the set of down-sampled light maps.

Although the subject matter described herein has been described in a language specific to structural features and/or method logic actions, it should be appreciated that the subject matter as defined in the appended claims is not limited to the specific features or actions described above. On the contrary, the specific features and actions described above are merely example forms for implementing the claims.

The invention claimed is:

1. A wearable computing device, comprising:
a processing unit; and
a memory coupled to the processing unit and storing instructions which, when executed by the processing unit, perform operations comprising:
receiving image data of an image of an environment in which the wearable computing device is situated;
adjusting pixel color values and pixel opacity of the image based on camera parameters used by a camera in capturing the image resulting in an adjusted image, the camera parameters including one or more of an exposure time, light sensitivity, and a gamma correction parameter;
determining, based on the adjusted image, ambient light information that indicates light intensities in the environment; and
adjusting specular or reflection of an object in a subsequent image of the environment based on the ambient light information.

2. The device according to claim 1, wherein the camera is onboard the wearable computing device, wherein the image data is received from the camera and wherein capturing the image of the environment comprises:
determining, based on a parameter indicating a field of view range of the camera, a plurality of shooting directions required for covering the environment; and
causing the camera to capture a plurality of images according to the plurality of shooting directions.

3. The device according to claim 1, wherein the determining ambient light information of the wearable computing device comprises:
generating a panorama image of the environment based on the adjusted image; and
mapping the panorama image to a cube map indicating the ambient light information.

4. The device according to claim 1, wherein the operations further comprise:
determining whether there is original ambient light information for e environment where the wearable computing device is located; and
in response to determining that there is the original ambient light information, updating the original ambient light information by using the determined ambient light information.

5. The device according to claim 4, wherein the updating the original ambient light information by using the determined ambient light information comprises:
dividing the original ambient light information into a first plurality of portions;
dividing the determined ambient light information into a second plurality of portions; and
in response to a difference between one of the first plurality of portions and a corresponding one of the second plurality of portions exceeding a threshold difference, modifying the original ambient light information with the determined ambient light information.

6. The device according to claim 1, wherein the operations further comprise:
rendering an object to a user of the wearable computing device based on the ambient light information.

7. The device according to claim 6, wherein the rendering an object to a user of the wearable computing device based on the ambient light information comprises:
generating an initial light map associated with the object based on the ambient light information;
down-sampling the initial light map to generate a set of down-sampled light maps having different resolutions; and
rendering the object based on the set of down-sampled light maps.

8. A method implemented by a wearable computing device, comprising:
receiving image data of an image of an environment in which the wearable computing device is situated;
adjusting pixel color values and pixel opacity of the image based on camera parameters used by a camera in capturing the image resulting in an adjusted image, the camera parameters including one or more of an exposure time, light sensitivity, and a gamma correction parameter;
determining, based on the adjusted image, ambient light information that indicates light intensities; and
adjusting specular or reflection of an object in a subsequent image of the environment based on the ambient light information.

9. The method according to claim 8, wherein the camera is onboard the wearable computing device and wherein the capturing the image of the environment where the wearable computing device is located comprises:
determining, based on a parameter indicating a field of view range of the camera, a plurality of shooting directions required for coveting the environment; and
causing the camera to capture a plurality of images according to the plurality of shooting directions.

10. The method according to claim 8, wherein the determining ambient light information of the wearable computing device comprises:
 generating a panorama image of the environment based on the adjusted image; and
 mapping the panorama image to a cube map indicating the ambient light information.

11. The method according to claim 8, further comprising:
 determining whether there is original ambient light information for the environment where the wearable computing device is located; and
 in response to determining that there is the original ambient light information, updating the original ambient light information by using the determined ambient light information.

12. The method according to claim 11, wherein the updating the original ambient light information by using the determined ambient light information comprises:
 dividing the original ambient light information into a first plurality of portions;
 dividing the determined ambient light information into a second plurality of portions; and
 in response to a difference between one of the first plurality of portions and a corresponding one of the second plurality of portions exceeding a threshold difference, modifying the original ambient light information with the determined ambient light information.

13. The method according to claim 8, further comprising:
 rendering an object to a user of the wearable computing device based on the ambient light information.

14. The method according to claim 13, wherein the rendering an object to a user of the wearable computing device based on the ambient light information comprises:
 generating an initial light map associated with the object based on the ambient light information;
 down-sampling the initial light map to generate a set of down-sampled light maps having different resolutions; and
 rendering the object based on the set of down-sampled light maps.

15. A non-transitory computer storage medium storing a computer program product and comprising machine executable instructions which, when miming on a wearable computing device, cause the wearable computing device to perform operations comprising:
 receiving image data of an image of an environment in which the wearable computing device is situated;
 adjusting pixel color values and pixel opacity of the image based on a camera parameter used by a camera in capturing the image resulting in an adjusted image; the camera parameter including one or more of an exposure time, light sensitivity, and a gamma correction parameter;
 determining, based on the adjusted image, ambient light information that indicates light intensities in the environment, and
 adjusting specular or reflection of an object in a subsequent image of the environment based on the ambient light information.

16. The non-transitory computer storage medium according to claim 15, wherein adjusting pixel color values of the image based on camera parameters includes raising the pixel color values to the gamma correction parameter and dividing by a result of multiplying the light sensitivity by the exposure time.

17. The non-transitory computer storage medium according to claim 15, wherein the operations further comprise, wherein the camera is onboard the wearable computing device and wherein capturing the image of the environment comprises:
 determining, based on a parameter indicating a field of view range of the camera, a plurality of shooting directions required for coveting the environment; and
 causing the camera to capture a plurality of images according to the plurality of shooting directions.

18. The non-transitory computer storage medium according to claim 15, wherein the determining ambient light information of the wearable computing device comprises:
 generating a panorama image of the environment based on the adjusted image; and
 mapping the panorama image to a cube map indicating the ambient light information.

19. The non-transitory computer storage medium according to claim 15, wherein the operations further comprise:
 determining whether there is original ambient light information for the environment where the wearable computing device is located; and
 in response to determining that there is the original ambient light information, updating the original ambient light information by using the determined ambient light information.

20. The non-transitory computer storage medium according to claim 19, wherein the updating the original ambient light information by using the determined ambient light information comprises:
 dividing the original ambient light information into a first plurality of portions;
 dividing the determined ambient light information into a second plurality of portions; and
 in response to a difference between one of the first plurality of portions and a corresponding one of the second plurality of portions exceeding a threshold difference, modifying the original ambient light information with the determined ambient light information.

* * * * *